Patented July 22, 1941

2,249,789

UNITED STATES PATENT OFFICE 2,249,789

FERMENTATION

Alfred S. Schultz and Lawrence Atkin, Bronx, and Charles N. Frey, Scarsdale, N. Y., assignors to Standard Brands Incorporated, New York, N. Y., a corporation of Delaware No Drawing. Application May 7, 1937, Serial No. 141,278

10 Claims. (Cl. 195—37)

The invention relates to a method for stimulating the fermentation of a sugar substance by yeast. It relates also to a procedure whereby the vitamin $B_1$ content of a material may be determined, and includes correlated improvements and discoveries whereby fermentation of sugar solutions and determination of vitamin $B_1$ are facilitated.

An object of the invention is to provide a method whereby the rate of fermentation of a yeast fermentable sugar containing substance is enhanced so that a given quantity of sugar may be converted in a lesser time interval, or a greater amount of sugar will be fermented in a certain period.

A further object of the invention is the provision of a method which increases the fermentation rate of yeast fermentable sugars by the inclusion of the wort or mash of a small quantity of vitamin $B_1$.

A particular object of the invention is the provision of a procedure in accordance with which the vitamin $B_1$ content of a material may be estimated by a determination of the increase in rate of fermentation, or in gas production.

A specific object of the invention is to provide a method for the stimulation of gas production in a fermenting sugar solution by the inclusion therein of pure crystalline vitamin $B_1$.

Other objects of the invention will in part be obvious and will in part appear hereinafter.

The invention accordingly comprises the several steps and the relation of one or more of such steps with respect to each of the others thereof, which will be exemplified in the method hereinafter disclosed, and the scope of the invention will be indicated in the claims.

In the practice of the invention the fermentation of a sugar may be stimulated by preparing a wort or a mash containing a yeast fermentable sugar material, inoculating with yeast, and including therein vitamin $B_1$, preferably in pure crystalline form and prepared synthetically. The wort or mash may be a sugar, as a dextrose solution containing ammonium phosphate, or other salt serving as a yeast nutrient material, and acting also as a buffer to preclude the setting up of an acid concentration deleterious to the fermenting property of yeast.

Further, the wort or mash may be prepared from a carbohydrate, as a starch material, through saccharification whereby the yeast fermentable sugar in suitable concentration is obtained. Such a mash is that which is obtained by the saccharification of starch in the production of worts or mashes which are fermented in the preparation of spirits or alcohol. Saccharification of starch may be effected, for example, by treatment with mineral acid, followed by diastatic conversion or entirely by the employment of diastatic enzymes.

When the wort has been prepared and inoculated with yeast under usual conditions, fermentation is permitted to take place in the ordinary manner, with the addition thereto either before or during the fermentation of pure vitamin $B_1$ in a relatively small amount. The fermentation rate, i. e., the time within which a given amount of sugar will be fermented, is thereby decreased through a stimulation of the gas production. Moreover, we have found that the inclusion of a certain amount of vitamin $B_1$ under prescribed conditions occasions a definite stimulation of fermentation, and hence an increase in gas produced. This increase in gas production can be taken as a measure of the vitamin $B_1$ content of the material under consideration. There is thus provided a procedure for the estimation of vitamin $B_1$ which may be readily carried out and the results of which are capable of quantitative expression. Thus a solution containing dextrose, ammonium phosphate and yeast may have varying amounts of vitamin $B_1$ added thereto, and as the amount of vitamin $B_1$ increases the gas produced within a given time interval, as three hours, likewise increases. This is illustratively shown in the following examples.

EXAMPLE I

To solutions containing 3 grams of dextrose, 15 cc. of a phosphate solution having a concentration of .9 grams $NH_4H_2PO_4$ and .36 gram $(NH_4)_2HPO_4$, and 1 gram of yeast in a total volume of 100 cc. there was added a solution of crystalline vitamin $B_1$. The solutions were placed in a 30° C. water bath and shaken. The results obtained are given in the following tabulation:

|   |   | Gas at 3¼ hours | Total at finish | Cc. gas/g. dextrose |
|---|---|---|---|---|
| 1 | Check | 245 | 635 | 210 |
| 2 | 1 gamma vitamin $B_1$ | 285 | 645 | 215 |
| 3 | 2 gamma vitamin $B_1$ | 295 | 650 | 215+ |
| 4 | 4 gamma vitamin $B_1$ | 315 | 655 | 218 |
| 5 | 6 gamma vitamin $B_1$ | 335 | 665 | 220 |
| 6 | 8 gamma vitamin $B_1$ | 340 | 665 | 220 |

One gamma is equal to $1/1000$ of a milligram, and in the foregoing it is shown that this amount has a definite stimulation upon the fermentation of sugar by yeast, as is evidenced by an increase in gas production. Also, the fact that the quantity of gas produced per gram of sugar was greater with the higher amounts of vitamin $B_1$ shows that the sugar was more completely fermented or utilized.

EXAMPLE II

The stimulation of fermentation by yeast of a sugar solution may be utilized to determine vitamin $B_1$ content of a material, as a syrup in the manner given below. A dextrose solution containing ammonium phosphate and yeast was allowed to undergo fermentation as a check, and to a similar solution there was added 1 gamma of vitamin $B_1$, and to another such solution 4 gamma of vitamin $B_1$ as controls. To like solutions containing dextrose, ammonium phosphate and yeast, there were added .4 cc. of a 10% solution of a syrup, .8 cc. of the 10% solution of the same syrup, and to a third .8 cc. of a 10% solution of another syrup. The results obtained are given in the following table:

*Total gas at 3½ hours*

1. Check _____ 280
2. 1 gamma $B_1$ _____ 335
3. 4 gamma $B_1$ _____ 405
4. .4 cc. 10% syrup B _____ 355
5. .8 cc. 10% syrup B _____ 410
6. .8 cc. 10% syrup G _____ 355

It will be noted that the .8 cc. of syrup B conforms closely in gas production to 4 gamma of vitamin $B_1$. Consequently we have .8 cc. of the 10% solution equaling 4 gamma of vitamin $B_1$, from which it follows that 1 cc. will equal 5 gamma, and 10 cc., which is equivalent to 1 gram of the syrup, would contain 50 gamma of $B_1$. As a conversion factor for converting crystalline vitamin $B_1$ to International units, we use 250,000 International units per gram, or .25 units per gamma. Therefore, 1 gram of syrup B equals 50 gamma, or 50 times .2 equals 10 International units.

In the foregoing table .4 cc. of syrup B equals .8 cc. of syrup G in the gas production, and consequently one gram of this syrup contains 5 International units. By following this procedure it is possible to analyze for the vitamin $B_1$ content of various materials, and the results have been found to agree with those obtained by rat bio-assay.

EXAMPLE III

As evidencing the influence of vitamin $B_1$ upon the rate of fermentation, this example is presented. 1200 grams of corn syrup were diluted to 4700 cc., giving a solution having a Balling of about 220. This solution is then heated in order to sterilize it and to 450 cc. thereof contained in suitable receptacles there is added 2½ grams of yeast and ammonium phosphate, or urea, as shown in the subjoined table. The receptacles containing the solutions were incubated at a temperature of about 30° C.

| | Blg. after 24 hrs. | Blg. after 48 hrs. | Blg. after 77 hrs. | Blg. after 90 hrs. |
|---|---|---|---|---|
| 1 | 25 cc. $H_2O$ | 17.6 | 15.6 | 13.5 | 12.3 |
| 2 | 25 cc. $H_2O$ plus 25 cc. (2.1 g.) ammonium phosphate | 14.6 | 11.2 | 8.3 | 7.1 |
| 3 | 25 cc. $H_2O$ plus 25 cc. (2.1 g.) ammonium phosphate plus .05 gm. urea | 14.6 | 11.2 | 8.3 | 7.1 |
| 4 | 25 cc. $H_2O$ plus .05 gm. urea | 16.6 | 13.7 | 10.9 | 9.9 |
| 5 | 25 cc. (10 gamma/cc. vitamin $B_1$) | 16.6 | 13.7 | 11.2 | 9.8 |
| 6 | 25 cc. (10 gamma/cc. vitamin $B_1$) plus 25 cc. ammonium phosphate | 11.2 | 6.7 | 4.5 | 3.3 |
| 7 | 25 cc. (10 gamma/cc. vitamin $B_1$) plus 25 cc. ammonium phosphate plus .05 gram urea | 11.3 | 6.6 | 4.4 | 3.8 |
| 8 | 25 cc. (10 gamma/cc. vitamin $B_1$) plus .05 grams urea | 14.3 | 10.1 | 7.1 | 6.0 |

In the above table it is shown that the addition of vitamin $B_1$ increases the rate of fermentation inasmuch as the Balling, after given periods of time, is considerably less.

The foregoing procedures, which entail the addition of vitamin $B_1$ to a fermenting sugar solution, effect a marked stimulation in gas production, or increase in rate of fermentation due to such addition substantially without yeast growth. This stimulating effect may be adapted to the determination of the vitamin $B_1$ content of materials, such as syrups, malt sprouts, soy bean, yeast, and other sources of the vitamin $B_1$. These determinations can be made through the employment of pure crystalline $B_1$ as a standard or control means. Further, the application of the procedure to the fermentation of spirit mashes containing yeast fermentable sugars, for instance, a corn sugar spirit mash, accomplishes a faster fermentation, and hence a reduction in the fermentation time. The advantage thereof in connection with the production of spirits will be apparent, as will be also the facility with which vitamin $B_1$ content of materials may be evaluated in comparison with the previous rat bio-assay method.

When utilizing rats as a means for determining the vitamin $B_1$ content days and weeks are required to carry out the determination. By the procedure herein described the estimation may be made after a few hours, namely, three to four hours. Moreover, the wort which includes the vitamin $B_1$ as a stimulating means may contain in addition to a yeast fermentable sugar or carbohydrate material, various compounds which serve as yeast nutrients, and those having a stimulating effect upon the yeast. Such compounds are phosphates, as ammonium, sodium, potassium phosphates, ammonium salts as chlorides, sulfate, phosphate, urea, potassium salts as chloride, sulfate and phosphate, magnesium salts, especially the sulfate, and the like.

Further it is considered that the synthetic vitamin $B_1$ is composed of a thiazole fraction and a pyrimidine fraction, more especially of a combination of 4 methyl-5 beta-hydroxyethyl thiazole and 2-methyl-5 ethoxymethyl-6-aminopyrimidine and we have found that the fermentation of a sugar solution by yeast is stimulated particularly by the pyrimidine fraction. The thiazole fraction does not show the same activity. The determination of the stimulating effect of the pyrimidine in comparison with vitamin $B_1$ is shown by the fact that 3 gamma of the pyrimidine fraction had an effect equal to 4 gamma of vitamin $B_1$. The pyrimidine fraction consequently is considerably stronger than is vitamin $B_1$ itself.

Solutions utilized in preparing a yeast nutrient wort which may also be used for the estimation of the vitamin $B_1$ content as in syrups, yeast, yeast concentrates, wheat germ and the like products may be prepared in the following manners: A phosphate solution which may also act as a buffer can be prepared by dissolving 120 grams ammonium acid phosphate and 48 grams di-ammonium phosphate in distilled water and making the solution up to two liters. This solution is then filtered clear and placed in a suitable closed receptacle. It is maintained at substantially room temperature and does not require sterilization. A yeast stimulating calcium salt may also be included in the solution.

A solution containing dextrose may be prepared by dissolving 4.4 grams potassium dihydrogen phosphate, 3.4 grams potassium chloride, 1 gram calcium chloride, 1 gram magnesium sulphate and 400 grams dextrose in distilled water and making up to 2 liters. This solution should be maintained in sterile condition and 100 cc. thereof is placed in a suitable flask and sterilized for 15 minutes and three times intermittently. 15 cc. of this solution is utilized for a given test. The vitamin $B_1$ solution is prepared by dissolving 30 mg. of crystalline vitamin $B_1$ in distilled water and diluted to 300 cc. The solution thus contains 100 gamma per cc. and is further diluted 100 times in order that 1 cc. will equal 1 gamma. The yeast used in the fermentation is prepared by mixing 10 grams of yeast with distilled water and diluting to 250 cc. 25 cc. of such solution is used for a test. When using a pressed yeast it is first dried and then 1 gram is admixed with 100 cc. of distilled water and sterilized by heating for a period of 15 minutes. A syrup solution is prepared for analysis by taking 10 grams and diluting to 100 cc. This solution is sterilized and from 1 to 1.5 cc. may be used.

A determination of vitamin $B_1$ content may be carried out in accordance with the following outline:

| Gasometer bottle # | Cc. sol. dextrose | Cc. salt sol. | Cc. yeast (10 gms—250) | Added distilled $H_2O$ to volume 100 cc. |
|---|---|---|---|---|
| 1 | 15 | 15 | 25 cc. unknown (1 cc. syrup). | 44 |
| 2 | 15 | 15 | 25 cc. unknown (12 cc. yeast). | 33 |
| 3 | 15 | 15 | 25 4 cc. (4 gamma $B_1$) | 41 |

The yeast is added to the bottles as the last ingredient and the materials are shaken throughout the test and maintained at a temperature of about 30° C. The results obtained were:

| | 1 | 2 | 3 |
|---|---|---|---|
| 9:00 zero reading | 30 | 25 | 20 |
| 12:00 3 hour reading and end of determination | 340 | 345 | 335 |
| Total gas 3 hrs | 310 | 320 | 315 |

It is desirable to take an amount of the unknown sample so that the total gas will be very nearly equal to the 4 gamma $B_1$ standard. When this is accomplished then the weight of the unknown is compared to 4 gamma $B_1$. Calculation is then made for 1 gram of the unknown. To change gammas of $B_1$ into International units multiply by .25. That is 4 gamma $B_1=4\times.25$ or 1 International unit.

In the above example 1 cc. syrup (310 cc.) was equal to 4 gamma $B_1$ (315 cc.). Since 1 cc. syrup contains .1 gram and this equals 4 gamma, or 1 Int. unit. Therefore 1.0 gram syrup equals $10\times1$ or 10 Int. units.

Since certain changes may be made in carrying out the above method without departing from the scope of the invention, it is intended that all matter contained in the above description shall be interpreted as illustrative and not in a limiting sense.

Having described our invention, what we claim as new and desire to secure by Letters Patent is:

1. A method for stimulating fermentation by yeast, which comprises preparing a nutrient medium containing a yeast fermentable sugar material, inoculating said medium with yeast, incorporating vitamin $B_1$ therewith, and effecting fermentation of said sugar material substantially without yeast growth.

2. A method for stimulating fermentation of sugar solutions, which comprises preparing a wort containing a yeast fermentable sugar material and a source of yeast assimilable nitrogen, inoculating with yeast, incorporating vitamin $B_1$ therewith, and effecting fermentation of said sugar material substantially without yeast growth.

3. A method for stimulating fermentation of sugar solutions, which comprises preparing a wort containing a yeast fermentable sugar material, inoculating such wort with yeast, incorporating therewith synthetic vitamin $B_1$, and effecting fermentation of said sugar material substantially without yeast growth.

4. A method for stimulating fermentation in spirit mashes, which comprises preparing a mash containing a yeast fermentable sugar material, inoculating said mash with yeast, incorporating therewith synthetic vitamin $B_1$, and effecting fermentation of said sugar material substantially without yeast growth.

5. A method for stimulating fermentation of a sugar containing solution, which comprises preparing a wort containing a yeast fermentable sugar material, a yeast assimilable nitrogen containing compound and a yeast stimulating calcium salt, inoculating such wort with yeast, incorporating therewith synthetic vitamin $B_1$, and fermenting at a temperature of about 30° C. substantially without yeast growth.

6. A method for stimulating fermentation by yeast, which comprises preparing a nutrient medium containing a yeast fermentable sugar material, inoculating said medium with yeast, and incorporating an amino pyrimidine therewith.

7. A method for stimulating fermentation of sugar solutions, which comprises preparing a wort containing a yeast fermentable sugar material, inoculating said wort with yeast, and including 2.methyl, 5.ethoxy methyl, 6.amino pyrimidine.

8. A method for determining the vitamin $B_1$ content of a material, which comprises preparing a solution containing a yeast fermentable sugar and a yeast assimilable inorganic salt, adding yeast thereto and incorporating a vitamin $B_1$ containing material therewith, allowing fermentation to proceed substantially without yeast growth for a given period of time with agitation, determining volume of gas produced and comparing said gas volume with that arising from a like fermented solution to which vitamin $B_1$ in definite amount has been added.

9. A method for determining the vitamin $B_1$ content of a material, which comprises preparing a solution containing dextrose and an ammonium phosphate, adding yeast thereto and incorporating a vitamin $B_1$ containing material therewith, allowing fermentation to proceed substantially without yeast growth for a given period of time with agitation, determining volume of gas produced and comparing said gas volume with that arising from a like fermented solution to which vitamin $B_1$ in definite amount has been added.

10. A method for determining the vitamin $B_1$ content of a material, which comprises preparing solutions containing a yeast fermentable sugar and a yeast assimilable inorganic salt, adding yeast to one of said solutions, adding yeast and a definite amount of vitamin $B_1$ to another, and adding yeast and a vitamin $B_1$ containing material to still another, allowing fermentation to proceed substantially without yeast growth for a given period of time with agitation, determining volumes of gas produced, and comparing said gas volumes.

ALFRED S. SCHULTZ.
LAWRENCE ATKIN.
CHARLES N. FREY.

CERTIFICATE OF CORRECTION.

Patent No. 2,249,789.

July 22, 1941.

ALFRED S. SCHULTZ, ET AL.

It is hereby certified that error appears in the printed specification of the above numbered patent requiring correction as follows: Page 1, first column, line 19, for the word "of" after "inclusion" read --in--; page 2, first column, line 50, for "220" read --20--; and that the said Letters Patent should be read with this correction therein that the same may conform to the record of the case in the Patent Office.

Signed and sealed this 2nd day of September, A. D. 1941.

(Seal)

Henry Van Arsdale,
Acting Commissioner of Patents.